United States Patent [19]
Chapman

[11] Patent Number: 5,116,331
[45] Date of Patent: May 26, 1992

[54] PRESSURE TRANSDUCER AND SYSTEM FOR CRYOGENIC ENVIRONMENTS

[75] Inventor: John J. Chapman, Ware Neck, Va.

[73] Assignee: The United States of America as represented by the Administrator of the National Aeronautics and Space Administration, Washington, D.C.

[21] Appl. No.: 690,198

[22] Filed: Apr. 23, 1991

[51] Int. Cl.⁵ ............... G01L 7/08; G01L 9/06; G01L 19/14
[52] U.S. Cl. ............... 73/721; 73/708; 73/727; 73/756; 338/4
[58] Field of Search ............... 73/147, 706, 708, 721, 73/720, 727, 726, 754, 756, DIG. 4, 115; 338/4, 42; 29/621.1

[56] References Cited

U.S. PATENT DOCUMENTS 3,930,412  1/1976  Mallon et al. ............... 73/721

OTHER PUBLICATIONS

S. K. Kahng and J. J. Chapman. "Piezoresistive Silicon Pressure Sensors in Cryogenic Environment", ISA Paper #89-0066 (1989).

G. Wallis and D. I. Pomerantz. "Field Assisted Glass-Metal Sealing", J. App. Sci.. vol. 40. No. 10, Sep. 1969.

3 IMO Delaval Inc. Articles: (1) 4-600-0001 Pressure Sensor; (2) Pressure Transducer Type 4-313; and (3) CEC 6000 Silicon Diaphragm Pressure Transducer.

Primary Examiner—Donald O. Woodiel
Attorney, Agent, or Firm—Kevin B. Osborne

[57] ABSTRACT

A silicon pressure die is bonded to a borosilicate substrate above a pneumatic port. A Wheatstone bridge circuit is formed on the silicon pressure die and has bridge elements of silicon doped with boron to a deposit density level of approximately $1 \times 10^{19} - 10^{21}$ boron/cm³. A current source is provided to excite the Wheatstone bridge circuit. In addition, a temperature sensor is provided to provide temperature readings.

18 Claims, 15 Drawing Sheets

FIG. 3 MOUNTED SENSOR OFFSET VOLTAGE WITH CORRECTION

MOUNTED SENSOR PRESSURE SENSITIVITY WITH CORRECTION

ADHESIVE DISBOND OF PRESSURE SENSOR AS EVIDENCED IN OFFSET DATA

OPEN BRIDGE RESISTANCE OF A LIGHTLY DOPED PIEZORESISTIVE BRIDGE ELEMENT VARIATION WITH TEMPERATURE

OPEN BRIDGE RESISTANCE OF A HEAVILY DOPED PIEZORESISTIVE BRIDGE ELEMENT VARIATION WITH TEMPERATURE

CLOSED BRIDGE LIGHTLY DOPED SENSOR OUTPUT VARIATION WITH TEMPERATURE

CLOSED BRIDGE HEAVILY DOPED SENSOR UNAMPLIFIED OUTPUT VARIATION WITH TEMPERATURE

THERMAL OFFSET PROFILE OF HEAVILY DOPED SENSOR MOUNTED WITH EPOXY, AMPLIFIED 1000X, COMPUTER CORRECTED VS UNCORRECTED

THERMAL SENSITIVITY PROFILE OF HEAVILY DOPED SENSOR MOUNTED WITH EPOXY, AMPLIFIED 1000X COMPUTER CORRECTED VS UNCORRECTED

THERMAL OFFSET PROFILE OF HEAVILY DOPED SENSOR ELECTROSTATICALLY BONDED TO A PYREX SUBSTRATE, AMPLIFIED 1000X, NO ERROR CORRECTION

THERMAL SENSITIVITY PROFILE OF A HEAVILY DOPED SENSOR ELECTROSTATICALLY BONDED TO A PYREX SUBSTRATE, AMPLIFIED 1000X, NO ERROR CORRECTION

PRESSURE TRANSDUCER AND SYSTEM FOR CRYOGENIC ENVIRONMENTS

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Technical Field of the Invention

The present invention relates generally to pressure sensing and more particularly to a multi-channel pressure transducer system for cryogenic environments.

2. Discussion of the Related Art

Pressure is one of the most important parameters measured when testing models in wind tunnels. Conventional commercial multi-channel pressure modules have several drawbacks when utilized in models tested in cryogenic environments of wind tunnels such as the National Transonic Facility at NASA Langley Research Center in Hampton, Va. First, it is difficult to maintain the transducer pressure modules within an acceptable operable temperature range above the tunnel temperature of approximately $-173°$ C. The transducers are often placed in incubator packages or supplied with heaters to provide an operable environment. These insulator packages must be relatively thick to provide adequate insulation in a cryogenic environment and accordingly are difficult to install in the relatively small spaces available in test models and aircraft. The heaters also undesirably heat the test airfoil as well at the immediate environment of the transducer, thereby contaminating the boundary layer test parameter.

Also, the application of standard silicon sensors for making pressure measurements in low temperature environments is severely limited in accuracy due to sensor element dopant levels being designed for the commercial market to maximize sensitivity to pressure over a temperature range of $-40°$ C. to $125°$ C. The main electronic impediment to sensor performance at temperatures below $-40°$ C. is apparently due to the phenomenon of charge carrier freeze-out and temperature dependence of mobility because of the relatively low dopant level of $10^{16}$ boron/cm$^3$ conventionally used in the piezoresistive Wheatstone bridge elements of the sensor. A proposed solution to charge carrier freeze-out at cryogenic temperatures entails the selection of sensors manufactured with highly doped, e.g., $>1.3 \times 10^{19}$ boron/cm$^3$, piezoresistive elements. Sensors fabricated with such high dopant levels are more thermally stable over a wide temperature range extending to low temperatures, but are also somewhat less sensitive to pressure. In addition, such proposed sensors are subject to mechanical failure due to temperature induced stresses and material mismatches at cryogenic temperatures.

OBJECTS OF THE INVENTION

It is accordingly an object of the present invention to sense pressure at cryogenic operating temperatures.

It is another object of the present invention to accomplish the foregoing object without a loss in pressure sensitivity associated with sensors having increased dopant levels.

It is another object of the present invention to achieve the foregoing objects without experiencing mechanical failure induced by cryogenic temperatures.

It is a further object of the present invention to accomplish the foregoing objects with a system which can be easily installed in a wind tunnel test model.

It is another object of the present invention to accomplish this pressure sensing without contaminating other test parameters such as the airfoil boundary layer.

Additional objects and advantages of the present invention are apparent from the specification and drawings which follow.

SUMMARY OF THE INVENTION

The foregoing and additional objects are obtained by a pressure sensor system for cryogenic environments according to the present invention. A silicon pressure die is bonded to a borosilicate substrate above a pneumatic port. A Wheatstone bridge circuit is formed on the silicon pressure die and has bridge elements of silicon doped with boron to a deposit density level of approximately $1 \times 10^{19} - 10^{21}$ boron/cm$^3$. A current source is provided to excite the Wheatstone bridge circuit. In addition, a temperature sensor is provided to provide temperature readings.

DETAILED DESCRIPTION

Figure 1:
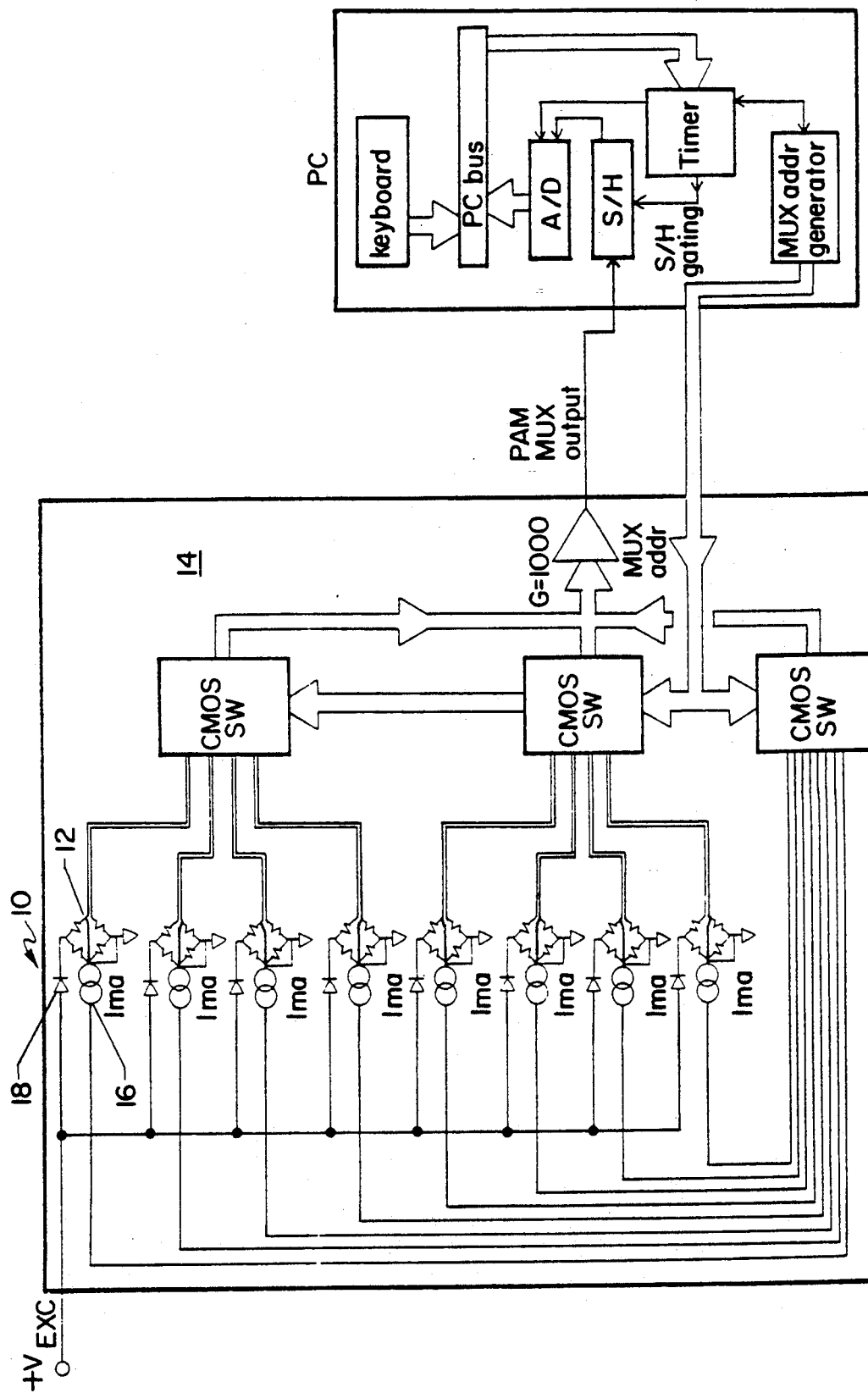
FIG. 1 is a schematic representation of an array system employing the pressure sensor of the present invention.

Referring now to FIG. 1, a multi-channel pressure transducer module 10 comprises eight silicon piezoresistive pressure sensors 12 mounted on a substrate 14 for sensing the wind tunnel model pressures. Eight temperature sensors 16 are mounted adjacent to the pressure sensors 12 to sense real time temperatures to correct for thermally induced sensor errors.

The problem of insensitivity to pressure normally experienced by sensors fabricated with high dopant levels, i.e., above $1 \times 10^{19}$ boron/cm$^3$, is solved by adjusting the signal conditioning amplification of pressure sensor 12 to a higher value of gain than normal as described below.

Other sources of thermally induced offset drift are due primarily to piezoresistive bridge element tracking errors, thermally induced stresses acting on the silicon membrane from the rim, the silicon-silicon dioxide layer interface stress, and the presence of mechanical stresses from the mounting method due to mismatch in the coefficients of thermal expansion rates between the silicon die, adhesive expansion-contraction action on the periphery of the sensor, and mismatches with the supporting substrate material. The present invention minimizes these sources of offset and sensitivity error by the careful selection of materials and the method of assembly.

Figure 2:
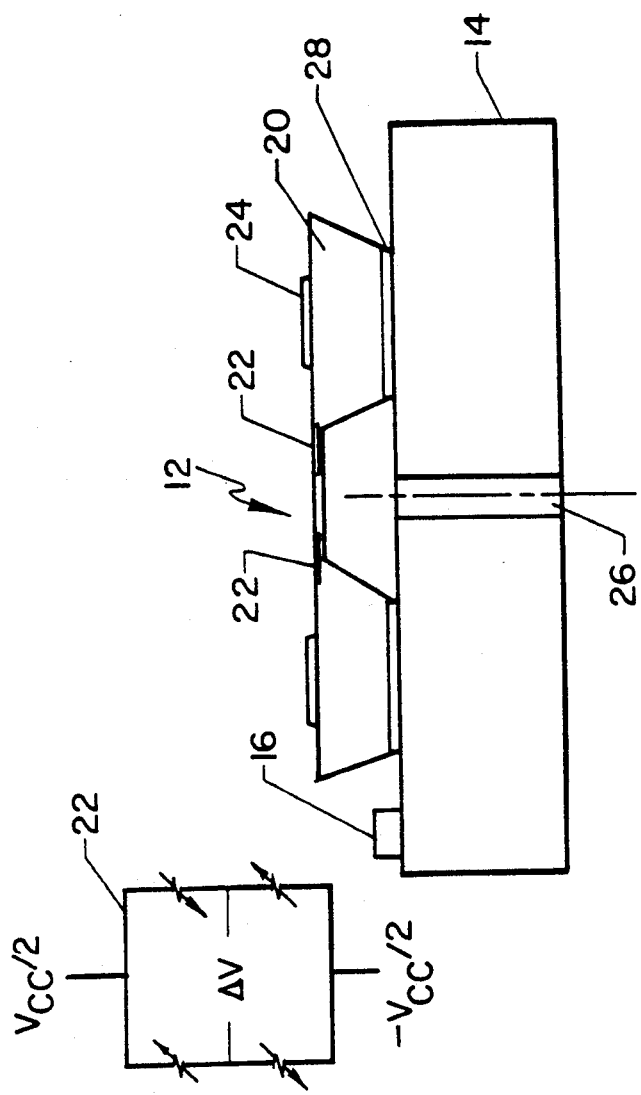
FIG. 2 is a side view of a pressure sensor according to the present invention.

Referring now to FIG. 2, a pressure sensor 12 according to the present invention is shown and comprises a piezoresistive, etched membrane silicon pressure sensor die 20 having a heavily doped Wheatstone bridge element 22, i.e., four arms, which is doped with boron to a dopant density range of approximately $1 \times 10^{19}$/cm$^3$ to $1 \times 10^{21}$/cm$^3$ via either high temperature diffusion or ion implantation. This doping is referred to as degenerate doping and results in the silicon semiconductor behaving more like a conductor. One particular sensor die 20 used measured 3 mm × 4 mm × 0.42 mm with a Wheatstone bridge element 22 of 20 μm × 400 μm using an optimized boron dopant density level of $1.3 \times 10^{19}$ boron/cm$^3$. Bridge elements 22 are electrically connected via aluminum pads 24. Aluminum pads 24 in turn provide an interconnection between the Wheatstone bridge circuit formed by element 22 and the substrate circuitry of, e.g., FIG. 16. Air flow is directed from the test environment to the highly doped bridge element 22 via a pneumatic port 26 located in substrate 14. The pressure of this airflow is indicated in a known manner by change in the resistance of the Wheatstone bridge circuit.

Figure 3:
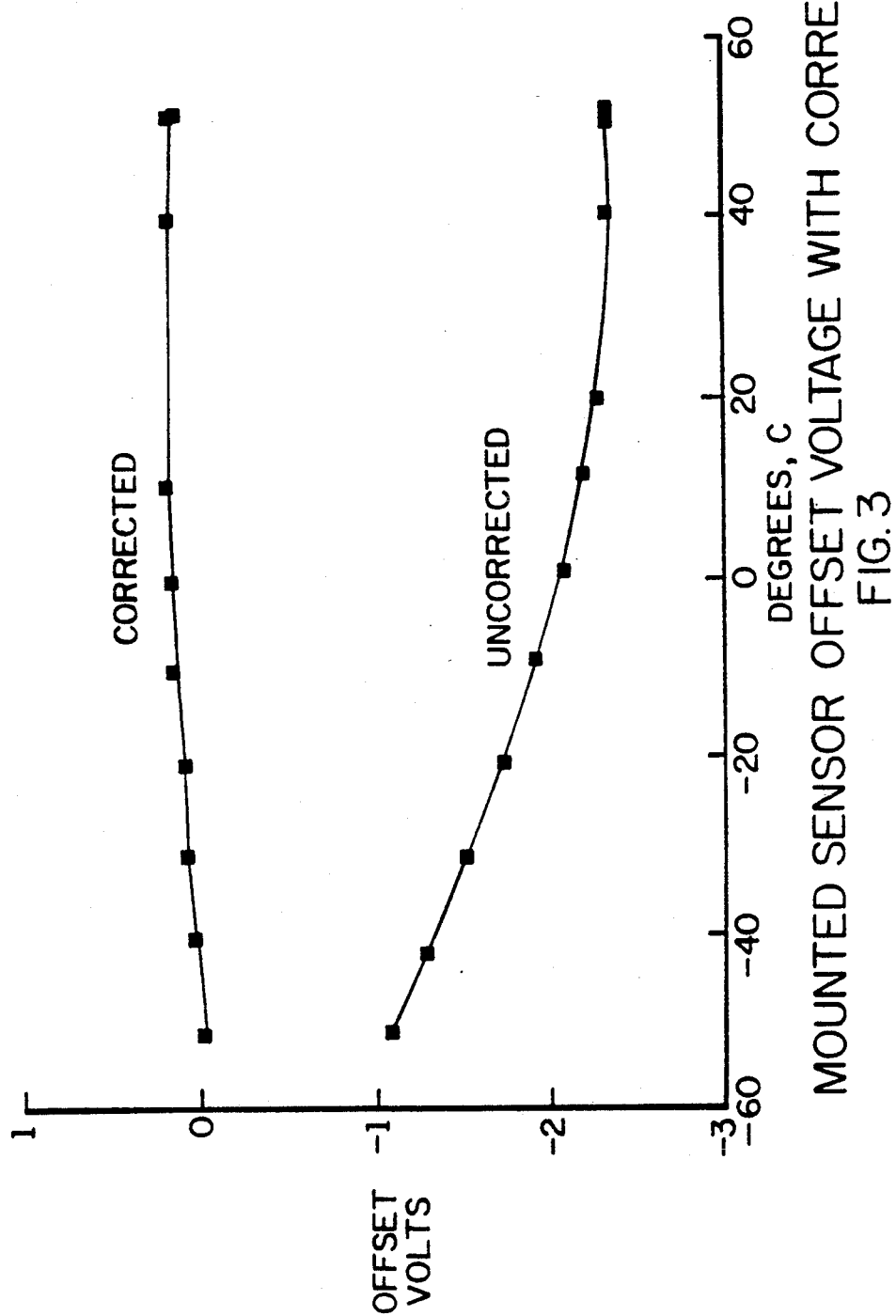
FIG. 3 is a graph showing the offset voltage for a mounted sensor.
Figure 4:
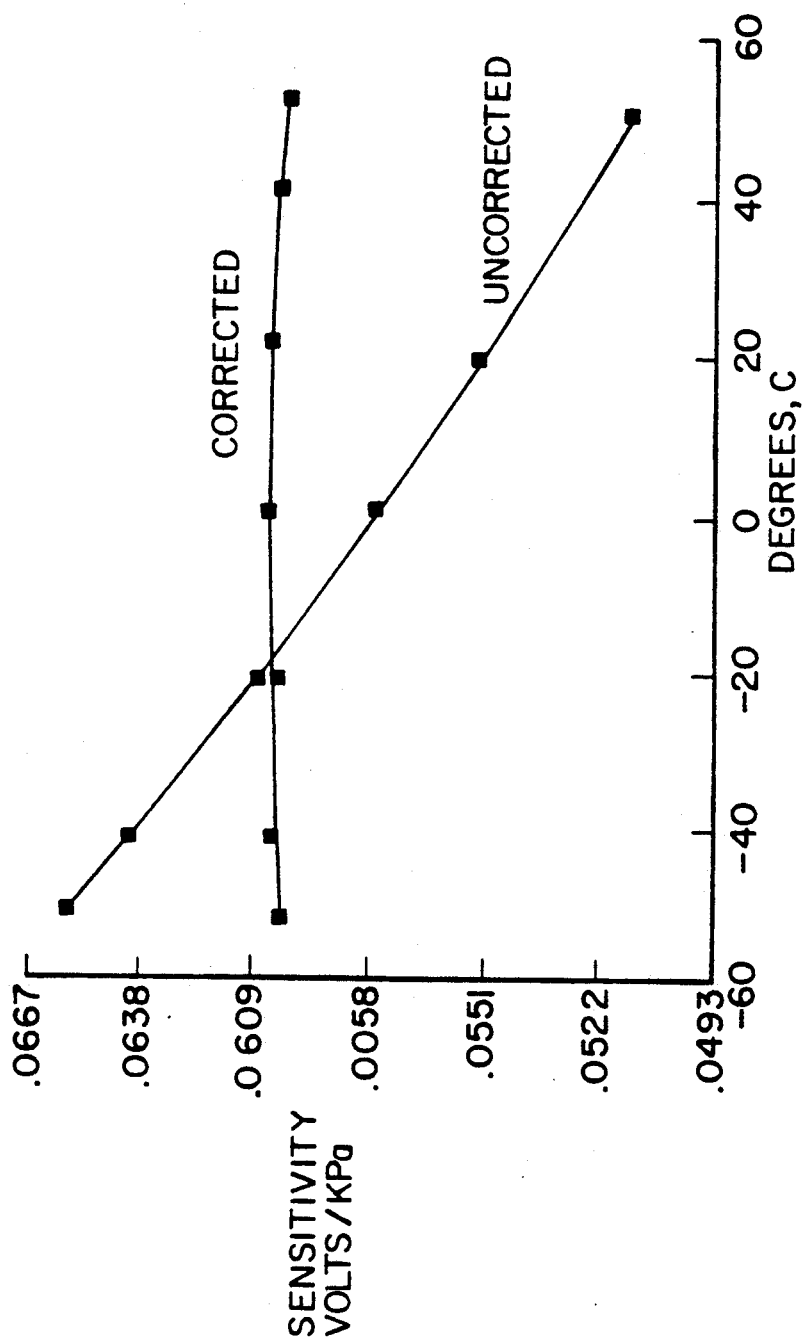
FIG. 4 is a graph showing the mounted sensor pressure sensitivity.

The sensors were tested over the temperature range from $-196°$ C. to $-60°$ C., and test results shown in FIG. 3 have demonstrated linear offset voltage plots over this temperature range for unmounted die 20. When a sensor die 20 is mounted to an alumina substrate with strain gauge epoxy, the sensitivity to pressure has also been observed to vary linearly with decreasing temperature over a useful operating temperature range $-50°$ C. to $+50°$ C., as demonstrated in FIG. 4. The response to thermal stimuli of pressure die bonded to a substrate is different from an unmounted die due to the mechanical stresses resulting from thermal expansion coefficient mismatches between the substrate material, the adhesive used to make the bond, and the pressure die itself. The choice of materials thus has a large effect upon the offset and sensitivity characteristics measured as test samples are subjected to environmental thermal cycling. The thermal calibration of such mounted die is repeatable within an error band of ±0.5% and the offset and sensitivity data can be fit to nth order polynomial equations. The coefficients of the characteristic equations fit to each sensor are used by the scanning computer to compensate the thermal response of the sensor to within ±0.5% F.S. for both offset errors, as in FIG. 3, and sensitivity errors, as in FIG. 4, for the case where the measurement temperature lies within the calibrated working temperature range of the sensor.

Figure 5:
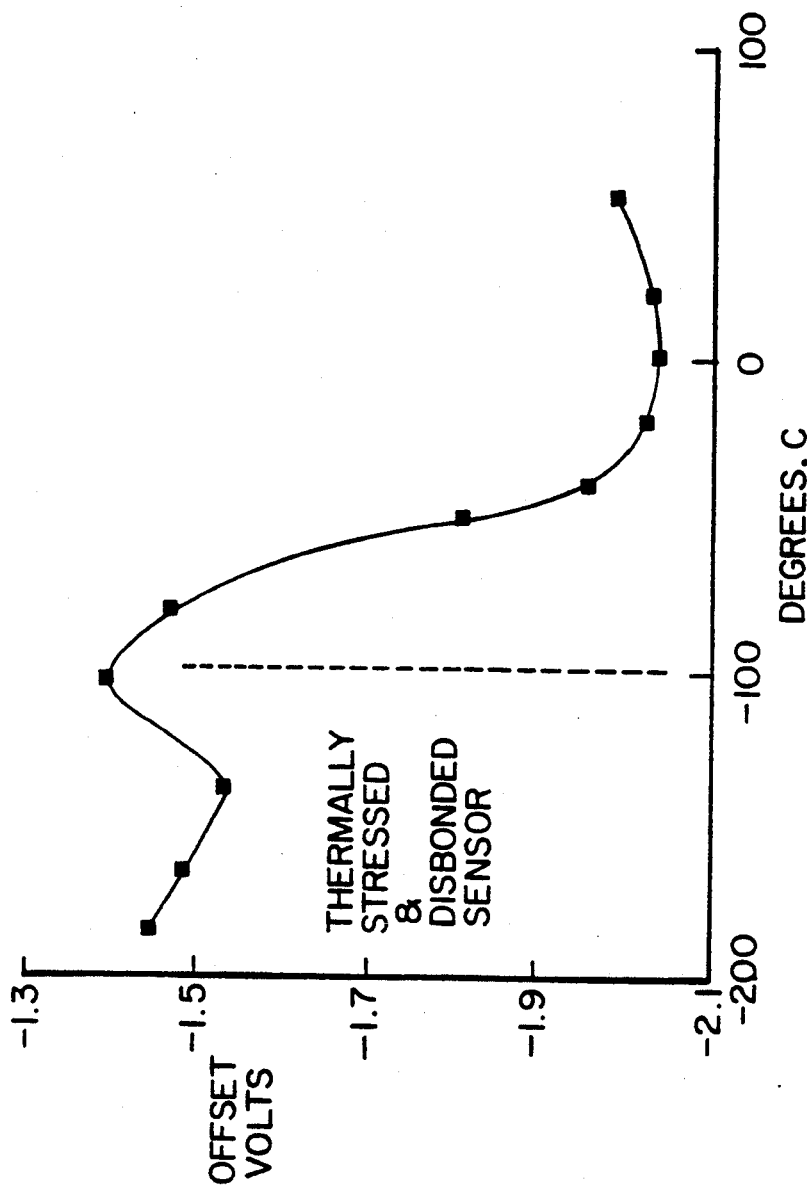
FIG. 5 is a graph of offset voltage indicating adhesive disbond at a critical temperature.

Because the choice of materials dominates the offset and sensitivity characteristics measured as test samples are subjected to environmental thermal cycling, the resultant thermal stress from mismatching materials will ultimately appear due to shearing forces building to high levels in the adhesive bondline below about $-100°$ C., which is observable as a gross inflection in the offset calibration curve of FIG. 5.

The requirement for structural integrity in electronic packaging is met by the use of metallic enclosures with low coefficients of thermal expansion such as invar and kovar alloys. The ceramic materials conventionally used for electrically insulating sensor substrates match the structural metals within a few ppm. These materials, however low in coefficient of thermal expansion, are still sufficiently mismatched when compared to the coefficient of thermal expansion of 2.5 ppm/°C. for highly doped silicon as shown in Table 1.

TABLE 1

Physical Parameters of Materials Used to Fabricate Pressure Sensing Module

| Material | Thermal Coeff. Expansion (ppm/°C.) | Resistivity (Ohm-cm) | Thermal Conductivity (W/m/K) | Youngs Modulus of Elasticity (Dyne/cm2) |
|---|---|---|---|---|
| Silicon | 2.5 | $10^{-2}$* | 138.5 | 16 |
| Alumina | 6.5 | $10^{14}$ | 35.6 | 54 |
| Chromium | 6.5 | $18.9 \times 10^6$ | 91.3 | 24.8 |
| Gold | 14.1 | $2.35 \times 10^6$ | 315.5 | 7.85 |
| Aluminum | 23.5 | $2.67 \times 10^6$ | 238 | 6.96 |
| Epoxy | 22-53 | $1 \times 10^{15}$ | 70 | |
| Indium | 24.8 | $8.8 \times 10E-6$ | 80 | |
| Molybdenum | 5.1 | $5.7 \times 10E-6$ | 137 | 29.4 |
| Palladium | 11.7 | 11 | | 16.6 |
| Ni—Fe Alloy | 4.14 | 29-82 | 14-15.5 | 147 |
| Pyrex 7740 | 3.2 | 10 E15 | 1.0 | 6.8 |
| Glass Epoxy | 3.25 | $1 \times 10^{17}$ | | 13.8 |

*Highly Doped Silicon ($>1.3 \times 10^{19}$ boron/cm$^3$)

The borosilicate glass has coefficient of thermal expansion of 3.2 ppm/1° C., which matches that of silicon within 0.7 ppm. Borosilicate also has a compatible Young's modulus of elasticity, namely 13.8 dyne/cm$^2$. Accordingly, borosilicate is an excellent candidate for substrate 14. One particularly suitable borosilicate substrate is made from a borosilicate designated Pyrex 7740, manufactured by Corning, Inc. The substrate 14 is flat and preferably has a surface topography having deviations within one wavelength of sodium light. The borosilicate substrate is metallized with thick film chrome-palladium conductors for substrate circuitry patterns shown. Cryogenically compatible Pb-Sn-Sb solder and standard thermocompression or wedge ball bonding technique are suitable for the IC to pad interconnections. The strength of the metallized pad to borosilicate substrate bond is 2108 kPa/cm$^2$. When pull test forces sufficient to separate the pad from the substrate are applied to the wire, a crater results in the test sample glass substrate. This indicates that the metallization is bonded as well as is practical to the substrate. Provided that the metallized films are less than 2.5 μm in thickness, the thermally induced separation of deposited conductors disbonding with the substrate over wide variations in temperature is not apparent. The metallization layer must however be of sufficient thickness and quality to successfully ball bond the interconnecting wires to its surface.

The silicon pressure dies 20 are bonded to the Pyrex substrate 14 by any conventional bonding method, e.g., by the known Mallory bonding technique described in "Field Assisted Glass-Metal Sealing," Wallis and Pomerantz, *Journal of Applied Physics*, Vol. 90, No. 10, Sep. 1969, pp. 3946-9. Alternatively, bonding may be achieved by a bonding substance such as glass epoxy or polyimide, by an Au/Sn solder, or by electrostatic bonding.

Previous testing of temperature sensors 16 has demonstrated that the linear temperature to current converter I.C. can be used over the −196° C. to +60° C. range for detecting the temperature adjacent to each pressure die to within ±0.5° C. The temperature sensor 16 is mounted on a metallic base which can be mounted with epoxy and, quite unlike the pressure die 12, is unaffected by thermally induced mounting stresses due to the monolithic silicon die geometry and the fact that it is not a force sensing device. The current proportional to temperature output of 1 $\mu$A/°C. is converted to a voltage by a 10-ohm precision resistor so that, for example, a temperature of 0° C. gives a nominal voltage of 2.73 millivolts developed across the resister, which when amplified by the gain of 1000 becomes 2.73 volts to the A/D encoder when scanned by the PC. Each temperature sensor is calibrated and fit to a first order slope intercept equation. The coefficients are used to determine the substrate temperature at each pressure die site when applying the offset and sensitivity thermal error corrections to the pressure signals.

Figure 7:
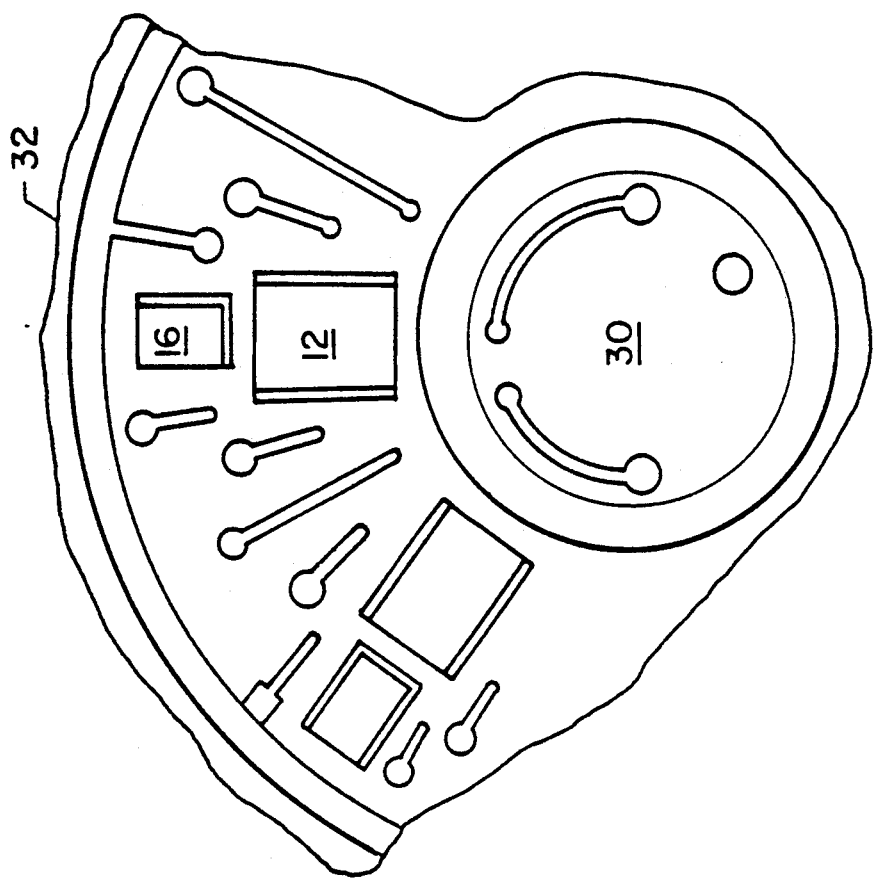
FIG. 7 is an enlarged partial view of the circular pressure sensor array of FIG. 6.
Figure 6:
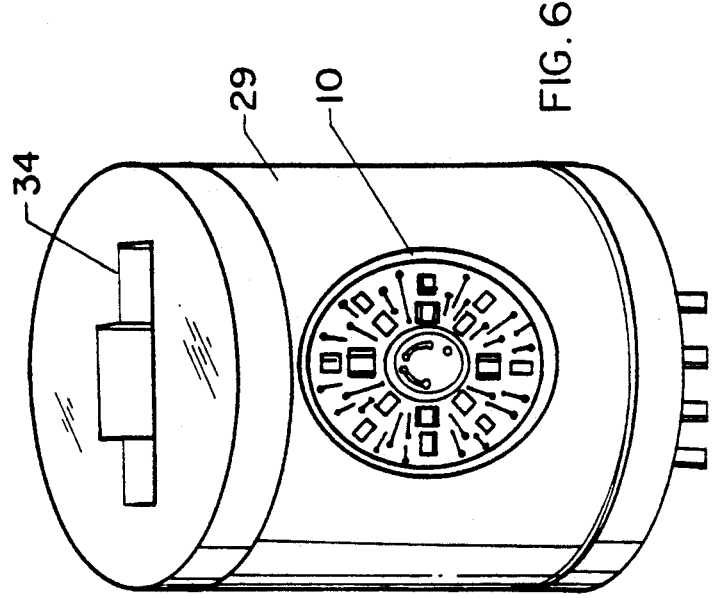
FIG. 6 is a perspective view of pressure sensing module having a circular pressure sensor array.

One embodiment of the multichannel sensor array 10 is shown in FIGS. 6 and 7 and consists of a circular array of eight channels of pressure sensors 12 capable of resolving 0.001 psid with eight channels of adjacent temperature sensors 16 accurate to within 0.5° C., and one precision resistance temperature sensor 30 at the center of the array accurate to within 0.1° C. This array is arranged on the exterior of a sidewall of cylindrical electronic enclosure 29 made of any suitable material such as invar and kevar alloys. The sensor substrate circuitry to interconnect the sensors is thick film metallization of a 2.54 cm diameter alumina disc 32. The array excitation and signal leads run directly from the metallized alumina disc solder pads and are wired to three miniature, hermetically sealed 15-pin electrical bulkhead feedthrough connectors 34 on the top plate. The pneumatic ports 26 on the underside of the substrate 14 have an aperture of 0.020 drilled through the substrate and the base plate to each pressure die. Cylindrical enclosure 29 protects the sensors and serves as a structural shell to support the top plate. Thermal offset calibration data files are obtained while the multichannel module is in the environmental chamber at an equilibrium calibration temperature with zero differential pressure applied to the pressure sensors 12.

The scanning of the eight pressure and eight temperature sensors is accomplished by the program "D16RAWMT". The resultant data files contain a digitized, 10-sample average of each pressure sensor output expressed in units of volts in file "AVEOUT" and each temperature sensor 10-sample averaged output in volts in file "AVETEMP". This data represents the characteristic curve of thermal offset for each sensor in the absence of pressure stimulus.

The program "GRAPHTEM" recalls the averaged temperature sensor output data (AVETEM) file and tailors each temperature channel to an nth order fit and saves these coefficients to a temperature coefficient file characterizing each temperature sensor (TEMCOEF).

The program "GRAPHSEN" is executed to calibrate the offset nulled sensor with calibration pressures. This requires that the equilibrium conditions of temperature calibration be repeated and also that the pressure calibration stimuli be simultaneously applied to the sensors. The "OFFCOEF" files are recalled and applied to null the offset error while the pressure sensitivity calibration is performed. The sensors are scanned and 10-sample averaged data files are saved. The pressure sensitivity data for each channel is normalized and then fit to an nth order fit by program "D16SENMT". The sensitivity correction coefficients are saved in "SENCOEF". The program "GRAPHD16" recalls the "TEMCOEF" and "SENCOEF" files to accomplish the combined sensor thermal offset and sensitivity error correction accurate to within ±0.5% F.S. for −50° C. to +50° C. for selected ±35 kPa silicon pressure sensors in thermal equilibrium. The restricted range in temperature is due to the materials limitations imposed by thermal coefficient of expansion mismatches. The coefficient of thermal expansion for silicon is 2.5 ppm which is only 38% of the 6.5 ppm expansion coefficient for the alumina substrate while the epoxy used is 53 ppm, over a 20× mismatch relative to silicon. The resiliency of the epoxy is progressively diminished during cryo-cooling as the bond is also being progressively stressed from the mismatch in materials. By imposing a lower limit of −50° C., repeatable offset and sensitivity curves will result which are capable of being fit by nth order regression coefficients within an acceptable ±0.5% error band. The same materials, if subjected to a −100° C. or below temperature extreme, would probably experience bondline cracking.

A personal computer has been successfully applied as a scanning interface to collect, store, and process multichannel pressure sensor data to correct the thermally induced offset and sensitivity errors to within an error band of ±0.5% F.S. for selected silicon pressure sensors optimized for cryogenic environments. Commercially available scanning software and hardware were modified to provide an efficient, task-specific means of accomplishing this otherwise tedious operation. Current prototypes using materials and methods of fabrication suitable for cryogenic applications have been built and tested in an effort to extend the useful lower measurement temperature limit from −50° C. to −196° C.

A commercially produced analog to digital data acquisition interface card capable of scanning up to 16-single ended analog inputs or 8-differential inputs has been used in a standard personnel computer to scan the pressure sensor outputs. A hardware programmable, fixed gain instrumentation amplifier may be user configured for unipolar or bipolar operation. The analog to digital conversion is done by a 12-bit successive approximation that can be triggered either by software command, external trigger, or by an on-board programmable controller.

Some modifications to the existing pc interface card circuitry were made in order to adapt the card to the system. The single pole CMOS multiplexing switches were replaced with double pole CMOS switch integrated circuits. These were relocated to an intermediate interface card. The number of channels which may be scanned is changed from 16 to any multiple of 8, e.g., 8, 16, 32, 48, 64, channels may be scanned. The pc-card amplifier was bypassed and augmented with a high gain (33 1000) precision instrumentation amplifier located on the intermediate circuit card to boost the millivolt sensor output signals to adequate levels for the A/D converter. Current limiters (1 mA.) were put in the excitation circuit to each sensor bridge 22. All interconnecting lines are made with coaxial conductors for signal paths and a multiconductor parallel ribbon cable is used for switching pulses. All data scanned and digitized by the personal computer is saved to disk files for analysis and display.

Figure 8:
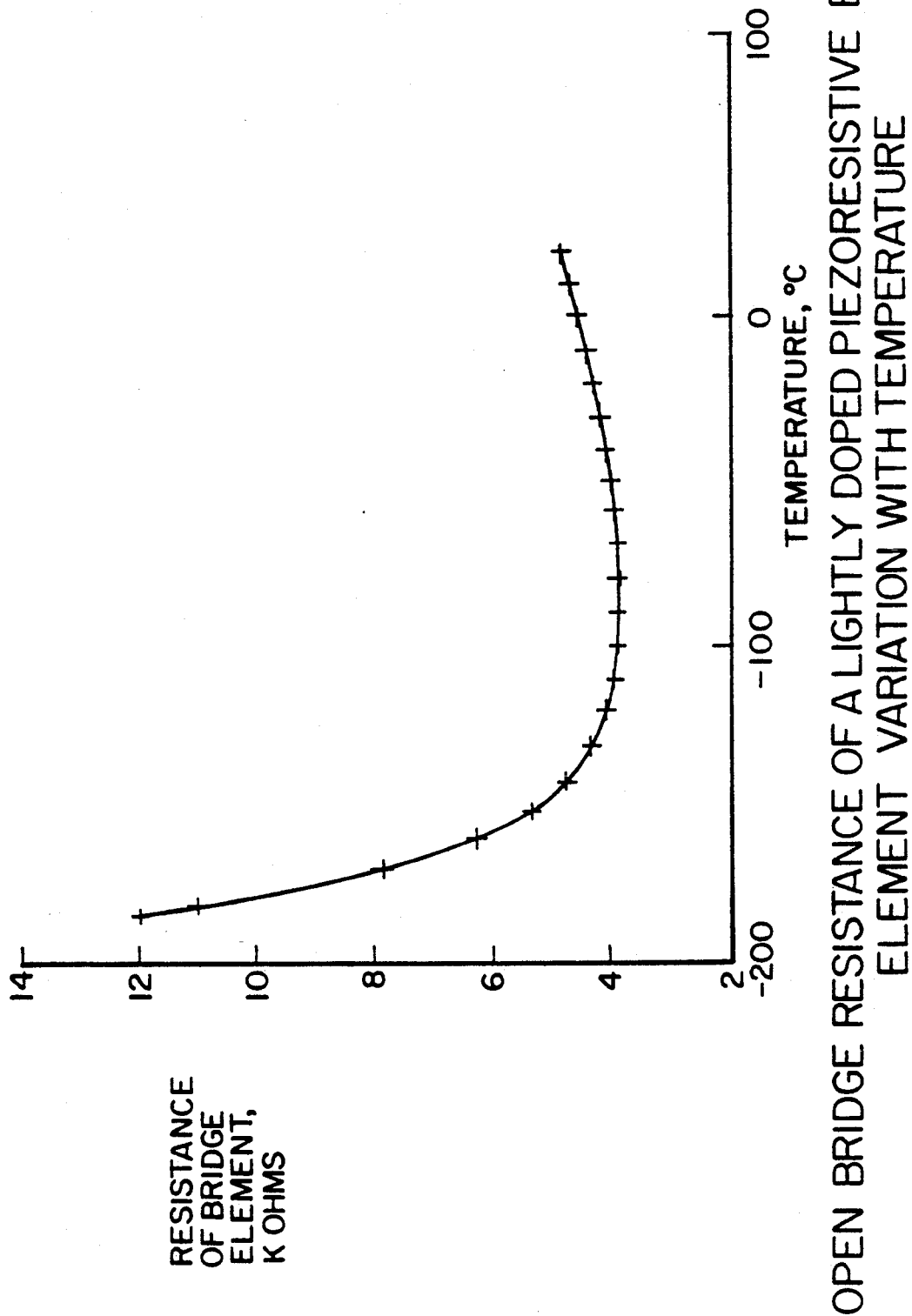
FIG. 8 graphs the open bridge resistance of a lightly doped sensor versus temperature.
Figure 9:
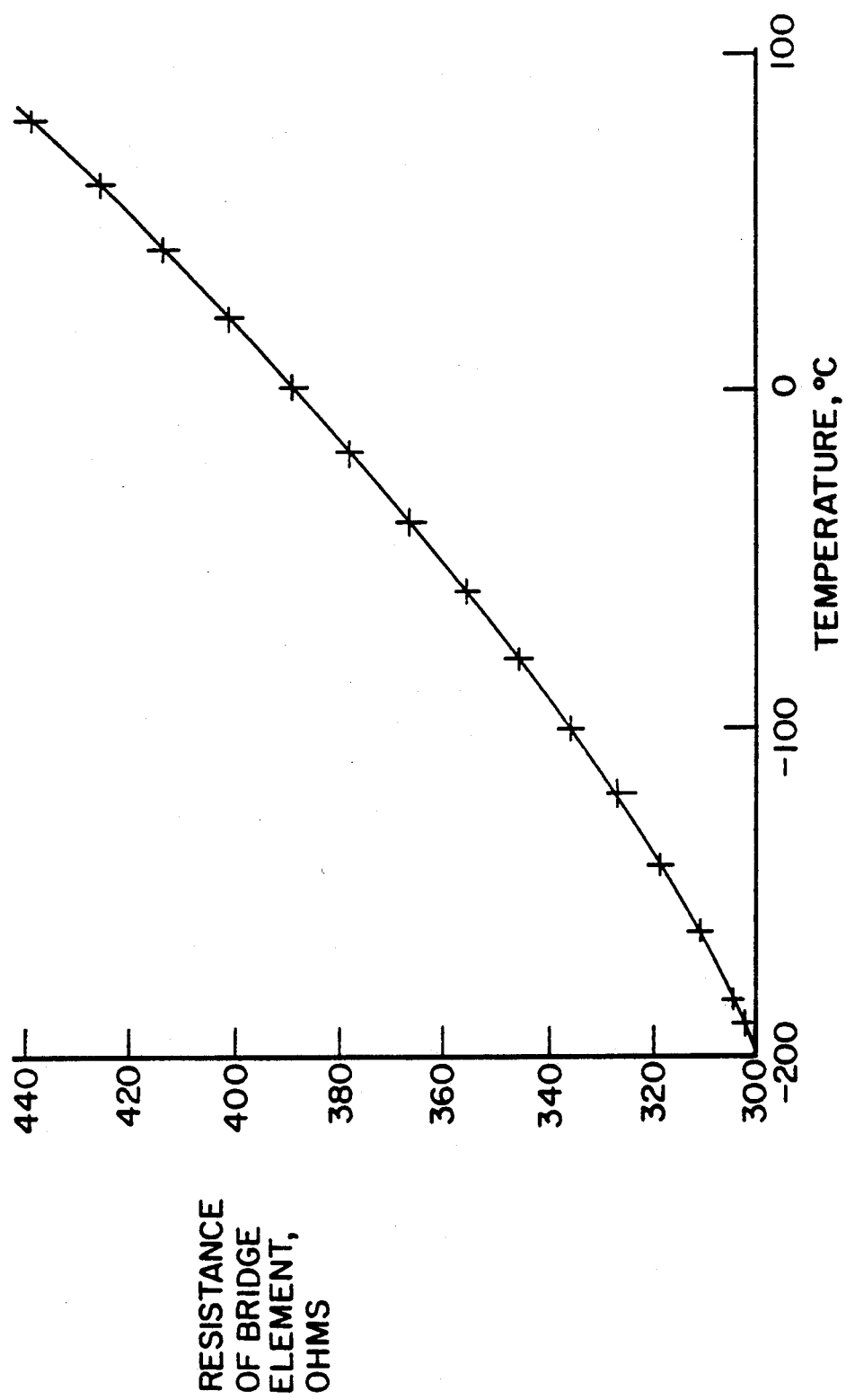
FIG. 9 graphs the open bridge resistance of a heavily or highly doped sensor versus temperature.
Figure 10:
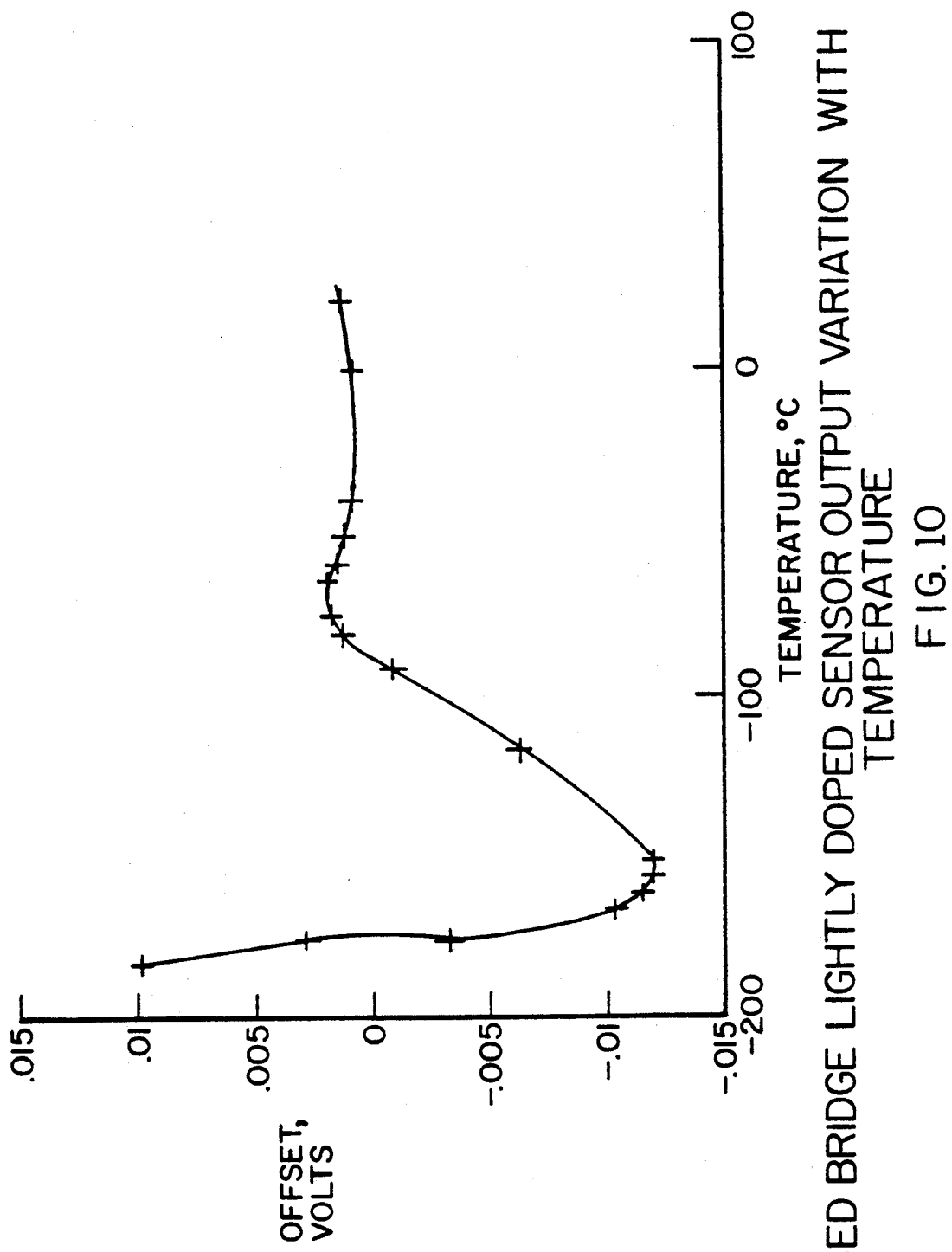
FIG. 10 graphs the closed bridge output of a lightly doped sensor versus temperature.
Figure 11:
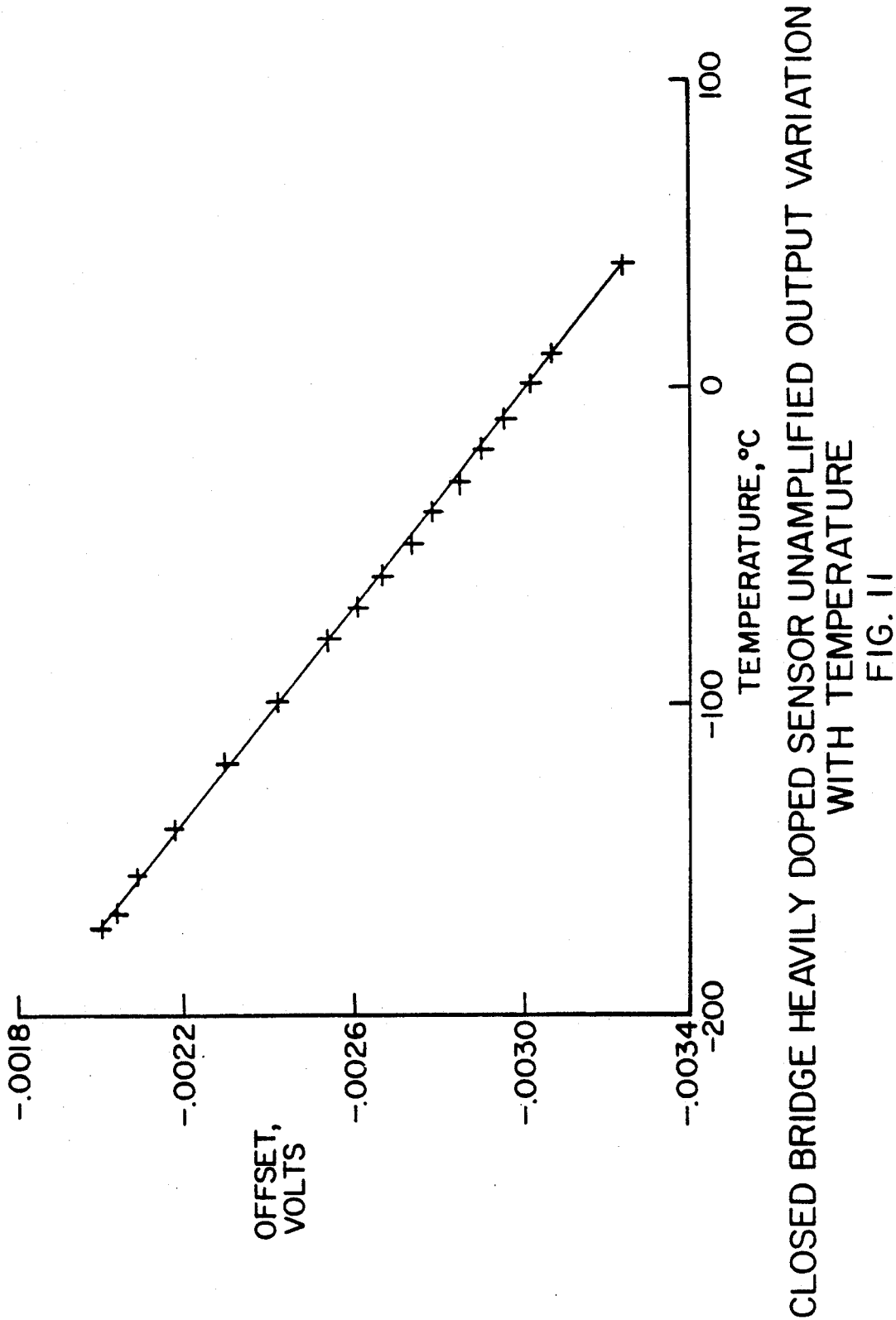
FIG. 11 graphs the closed bridge output of a highly doped sensor versus temperature.
Figure 12:
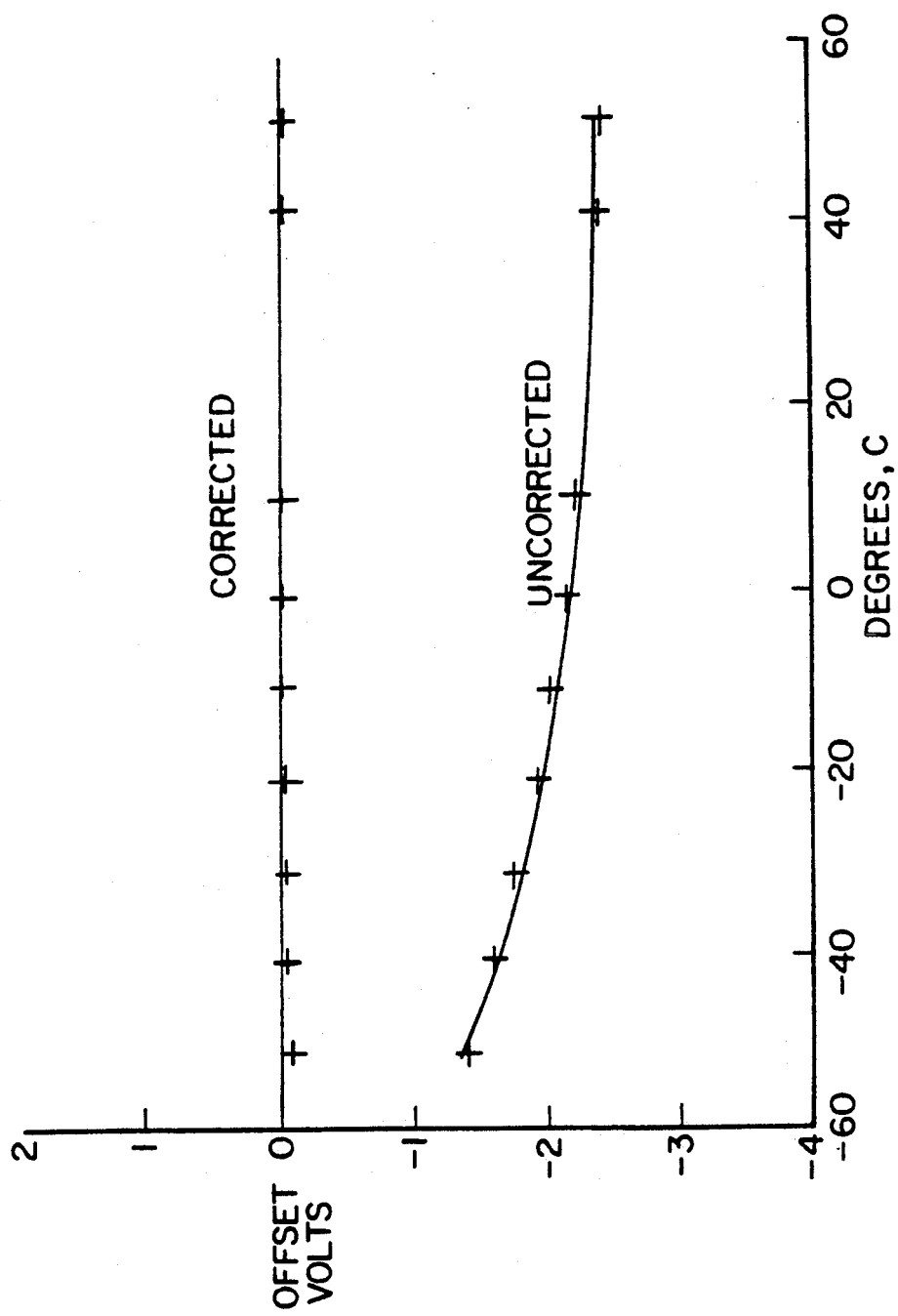
FIG. 12 graphs the thermal offset of a highly doped, epoxy mounted sensor for corrected and uncorrected data.
Figure 13:
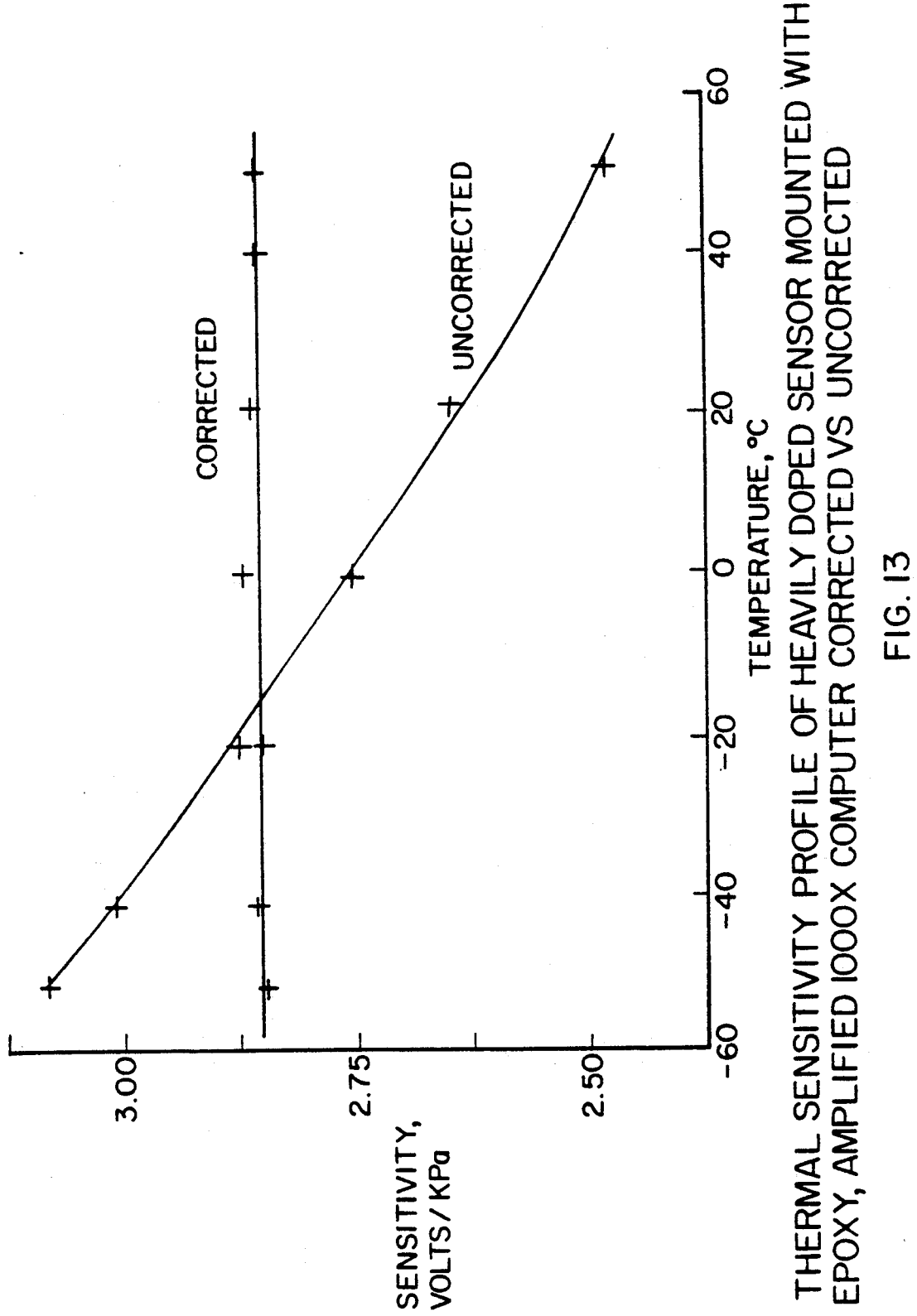
FIG. 13 graphs the thermal sensitivity of a highly doped, epoxy mounted sensor.

The open bridge resistance of a piezoresistive element is plotted against temperature in FIG. 8 for the lightly doped ($10^{16}$ boron/cm$^3$) sensor and in FIG. 9 for a heavily doped ($1.3 \times 10^{19}$ boron/cm$^3$) sensor. The offset variations of a closed bridge lightly doped sensor operated at 1 mA. constant current input is plotted against temperature in FIG. 10 and the unmounted closed bridge, heavily doped sensor at 1 mA. constant current is plotted against temperature in FIG. 11. The advantages of the higher dopant levels are apparent below $-40°$ C. In FIG. 12, the uncorrected thermal offset profile of a highly doped sensor bonded to the substrate by epoxy is plotted from $-50°$ C. to $+50°$ C. along with the resultant corrected profile from the scanning computer. FIG. 13 shows the uncorrected sensitivity to pressure variation of a highly doped sensor bonded by epoxy along with the scanning computer generated profile corrected for thermal effects.

Figure 14:
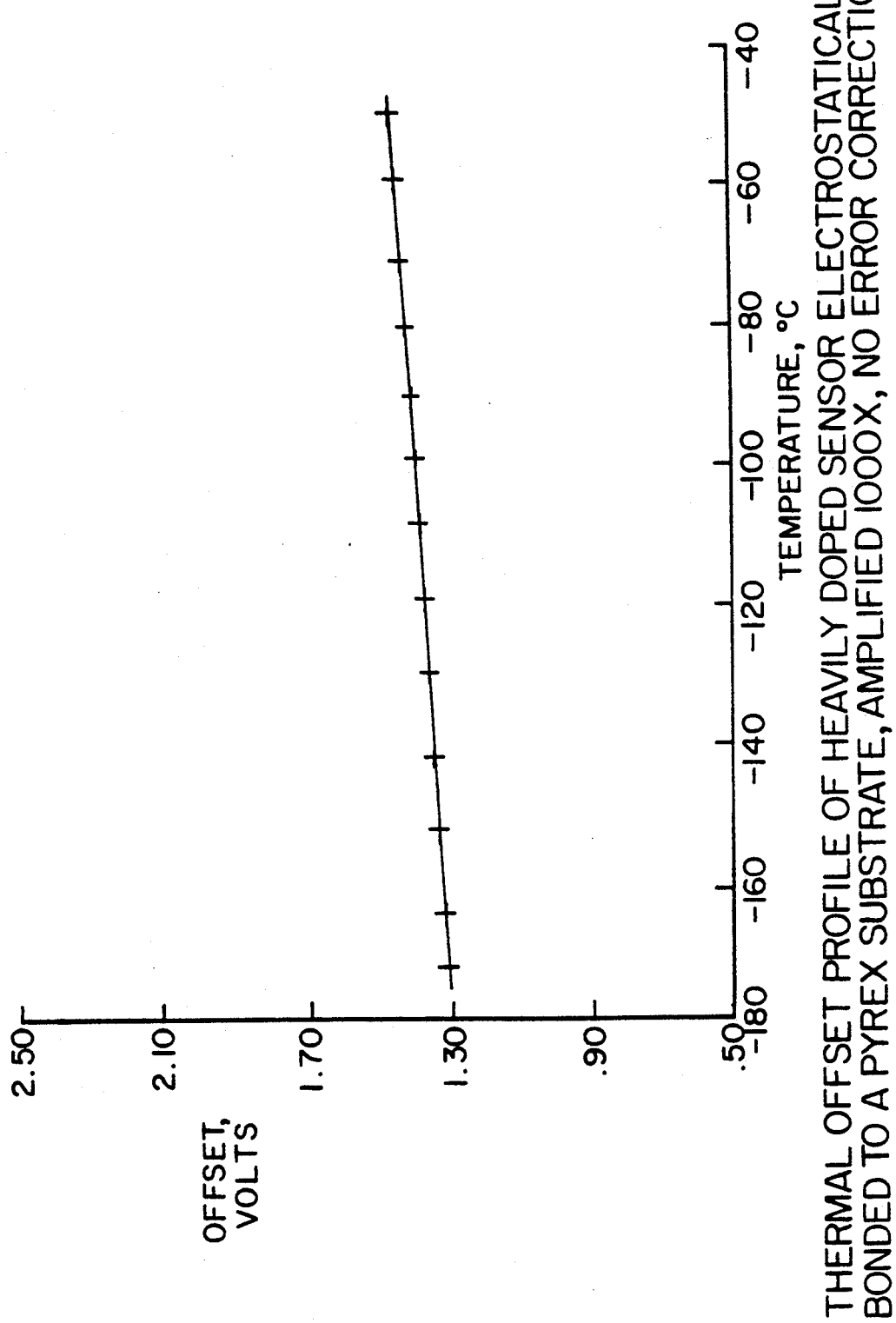
FIG. 14 graphs the uncorrected thermal offset of a highly doped, electrostatically bonded sensor.
Figure 15:
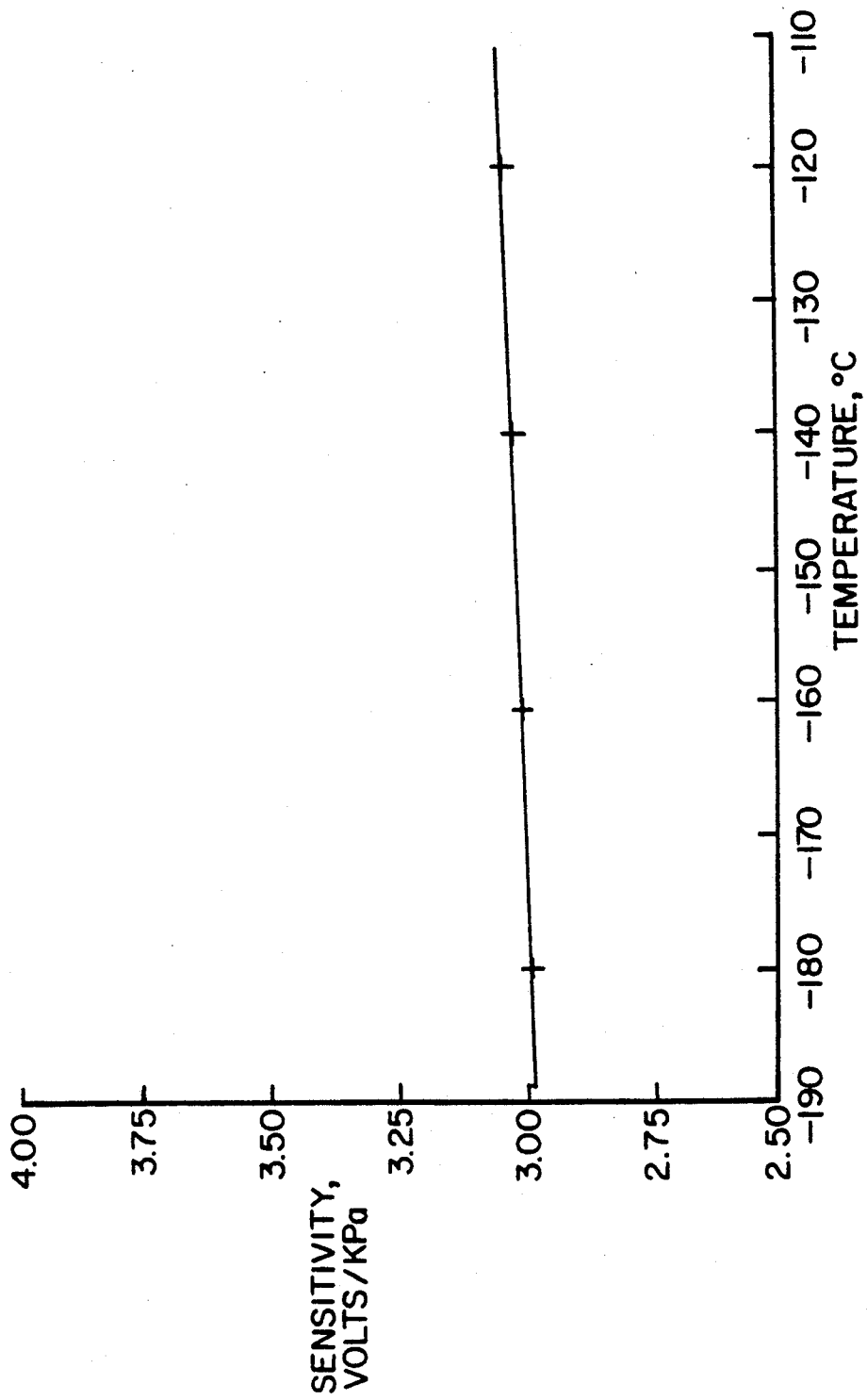
FIG. 15 graphs the uncorrected thermal sensitivity of a highly doped, electrostatically bonded sensor.

FIG. 14 is a plot of the thermally induced offset voltage of a highly doped silicon pressure sensor electrostatically bonded to a pyrex substrate. The magnitude of the thermally induced variation in offset is similar in profile to that of an unmounted sensor, suspended by 2.5 mil ball bond wires, when subjected to the same thermal environment. The amplified output at $-100°$ C. of a highly doped sensor 12 electrostatically bonded to borosilicate glass and followed by a signal conditioning amplifier gain of 1000 is equally stable, e.g., $\pm 0.1\%$ full scale at constant temperature, as compared to that of a low dopant level sensor at room temperature with an amplification gain factor of only 200, e.g., as shown in FIG. 14. FIG. 15 is a plot of sensitivity to pressure of the highly doped sensor electrostatically bonded to a pyrex substrate and calibrated from $-180°$ C. to $-120°$ C. The silicon pressure sensors 12 show a constant sensitivity to pressure of 2.9 volts/kPa over a $-100°$ C. to $-180°$ C. temperature range with an amplification factor of 1000 when powered by respective 1 mA. constant current sources 18, as shown in FIG. 1.

Pressure measurements accurate to within $\pm 0.5\%$ full scale output at cryogenic temperatures ($-184°$ C.) and above have been accomplished in the laboratory by employing highly doped piezoresistive silicon pressure sensors used in conjunction with real time computer assisted scanning and temperature compensation. By carefully matching the thermal coefficients of expansion of the materials used to fabricate the prototype multichannel modules, the intrinsic linearity of the cryogenically optimized sensors is more fully realized. The full development of this multichannel pressure module provides for accurate wind tunnel model pressure measurements at cryogenic temperatures and will eliminate the need for protective thermally controlled housings. In applications involving wind tunnel sidewall measurements, eliminating the requirement for thermally controlled housing greatly simplifies pressure module installation.

Figure 16:
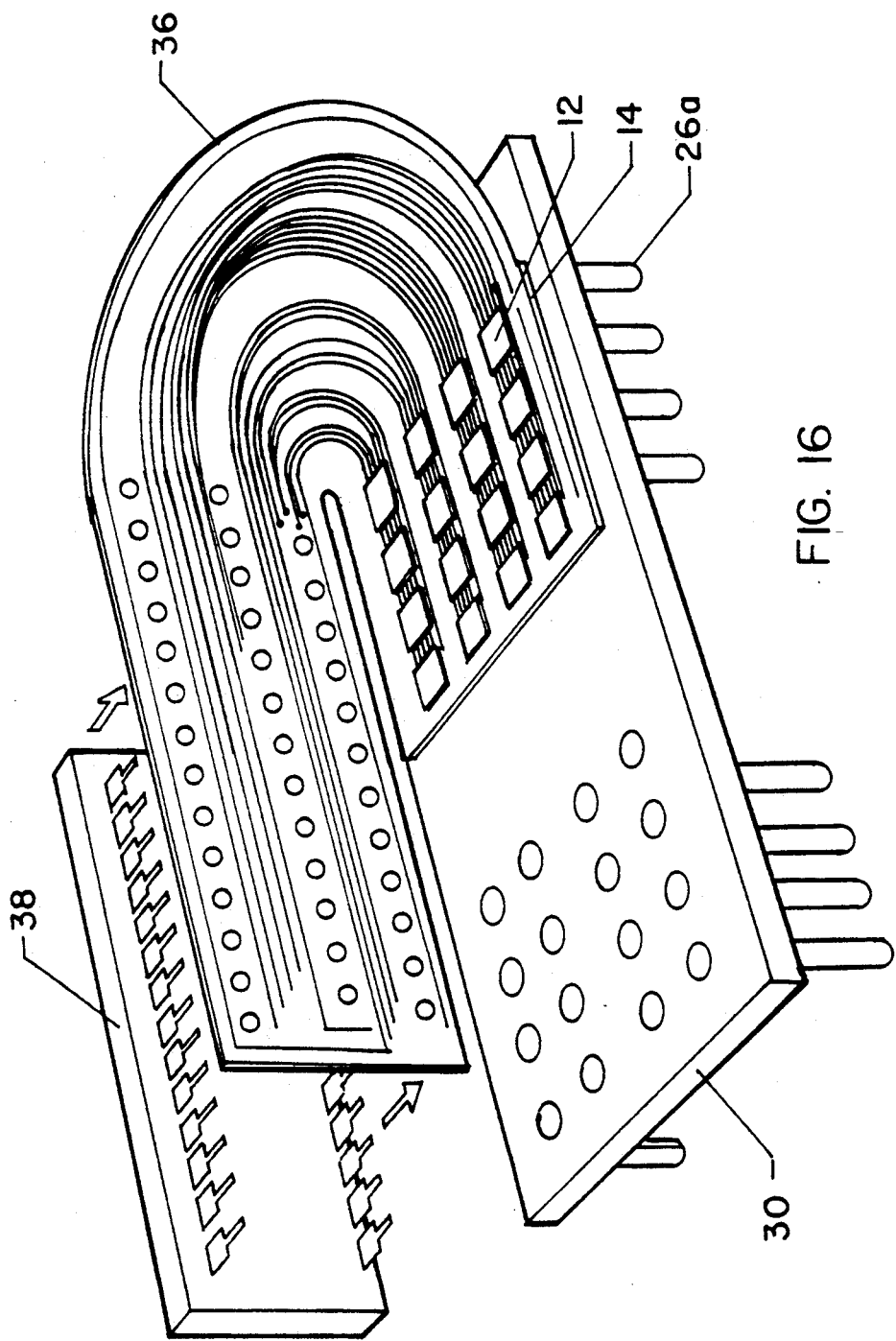
FIG. 16 is a perspective view of a pressure sensing array employing flexible interconnecting circuitry.

FIG. 16 shows another embodiment of the pressure sensor array according to the present invention. Flexible, interconnecting circuitry 36 is provided to connect the pressure sensors 12 with appropriate instrumentation via multiplexer 38. This circuitry is waffled, i.e., it has apertures corresponding to the arrangement of the pressure sensors on the substrate 14, to permit the circuitry to be formed about the pressure sensors for efficient interconnecting. The circuitry is then flexed so that a section of it is perpendicularly oriented to the substrate to permit connection with multiplexer 38. Pneumatic ports 26a pass through base plate 40 and force air to the ports of the pressure sensors to permit pressure sensing.

Many improvements, modifications and substitutions will be apparent to the skilled artisan without departing from the spirit and scope of the present invention as described and claimed herein.

What is claimed is:

1. A pressure sensor for use below $-55°$ C., comprising:
    a substrate composed of borosilicate, said borosilicate substrate having a pneumatic port passing therethrough;
    a silicon pressure die mounted on said borosilicate substrate above the pneumatic port;
    a Wheatstone bridge circuit formed on said silicon die, said Wheatstone bride circuit comprising bridge elements of silicon doped with boron to a dopant density level of approximately $1 \times 10^{19} - 10^{21}$ boron/cm$^3$.

2. The pressure sensor according to claim 1, wherein the dopant density level of the bridge elements is $1.3 \times 10^{19}$ boron/cm$^3$.

3. The pressure sensor according to claim 1, wherein said Wheatstone bridge circuit further comprises aluminum interconnects bonded to said silicon pressure die and electrically connected to the doped silicon bridge elements.

4. The pressure sensor according to claim 1, further comprising a temperature sensor bonded to said borosilicate substrate.

5. The pressure sensor according to claim 1, wherein said silicon pressure die is bonded to said borosilicate substrate by a glass epoxy.

6. The pressure sensor according to claim 1, wherein said silicon pressure die is bonded to said borosilicate substrate by a polyimide.

7. The pressure sensor according to claim 1, wherein said pressure die is electrostatically bonded to said substrate.

8. The pressure sensor according to claim 7, further comprising means for increasing an output current of the Wheatstone bridge circuit.

9. A pressure sensor array system for use below $-55°$ C. comprising:
    a borosilicate substrate having a plurality of pneumatic ports therethrough;
    a plurality of sensors mounted on said borosilicate substrate, one sensor above each pneumatic port, each sensor comprising a silicone pressure die and a Wheatstone bridge circuit formed on said silicon die, each Wheatstone bridge circuit comprising bridge elements of silicon doped with boron to a dopant level of approximately $1 \times 10^{19} - 10^{21}$ boron/cm$^3$.

10. The pressure sensor array system according to claim 9, wherein the pneumatic ports and said pressure sensors are arranged in a circular array.

11. The pressure sensor array system according to claim 9, further comprising a metal support base.

12. The pressure sensor array system according to claim 9, wherein said substrate is mounted on an electronic enclosure.

13. The pressure sensor array system according to claim 9, wherein the dopant density level of the bridge elements is $1.3 \times 10^{19}$ boron/cm$^3$.

14. The pressure sensor array system according to claim 9, wherein said Wheatstone bridge circuit further comprises aluminum interconnects bonded to said silicon pressure die and electrically connected to the doped silicon bridge elements.

15. The pressure sensor array system according to claim 9, further comprising a temperature sensor bonded to said borosilicate substrate.

16. The pressure sensor array system according to claim 9, wherein said silicon pressure die is bonded to said borosilicate substrate by a glass epoxy.

17. The pressure sensor array system according to claim 9, wherein said silicon pressure die is bonded to said borosilicate substrate by a polyimide.

18. The pressure sensor array system according to claim 9, wherein said pressure die is electrostatically bonded to said substrate.

* * * * *